United States Patent [19]
Ooka

[11] Patent Number: 4,491,031
[45] Date of Patent: Jan. 1, 1985

[54] SHIFT DRUM TYPE SPEED CHANGE MECHANISM FOR MOTORCYCLES

[75] Inventor: Yuzo Ooka, Tokyo, Japan

[73] Assignee: Honda Giken Kogyo Kabushiki Kaisha, Tokyo, Japan

[21] Appl. No.: 376,392

[22] Filed: May 10, 1982

[30] Foreign Application Priority Data

May 21, 1981 [JP] Japan .................. 56-77014

[51] Int. Cl.³ .................. F16H 5/06; B60K 20/02
[52] U.S. Cl. .................. 74/337.5; 74/474; 74/475
[58] Field of Search .......... 74/337.5, 474, 475, 74/335, 460, 462, 457, 435, 436, 437; 180/230

[56] References Cited

U.S. PATENT DOCUMENTS

| | | | |
|---|---|---|---|
| 3,421,384 | 1/1969 | Okamota et al. | 74/337.5 X |
| 4,055,093 | 10/1977 | Ross | 74/475 X |
| 4,279,174 | 7/1981 | Ross | 74/475 X |

FOREIGN PATENT DOCUMENTS

| | | | |
|---|---|---|---|
| 953493 | 11/1956 | Fed. Rep. of Germany | 74/337.5 |
| 2826040 | 12/1979 | Fed. Rep. of Germany | 74/474 |
| 55-106822 | 8/1980 | Japan | 74/474 |
| 56-28346 | 3/1981 | Japan | 74/475 |
| 56-22116 | 3/1981 | Japan | 74/475 |
| 176104 | 7/1961 | Sweden | 74/337.5 |
| 2041148 | 9/1980 | United Kingdom | 74/436 |

Primary Examiner—Leslie A. Braun
Assistant Examiner—Arthur T. Quiray
Attorney, Agent, or Firm—Lyon & Lyon

[57] ABSTRACT

A change speed gear mechanism for a motorcycle is controlled by a shift drum mounted to turn. First and second cam plates are coaxially fixed to the shift drum and means are provided for turning the cam plates for moving the shift drum in either direction in equal angular increments between a high speed position and a low speed position, each angular increment being larger than the angular value calculated by dividing 360° by the total number of gear ratios provided by the speed change gear mechanism.

6 Claims, 12 Drawing Figures

SHIFT DRUM TYPE SPEED CHANGE MECHANISM FOR MOTORCYCLES

The present invention relates to a shift drum type speed change mechanism for motorcycles.

In this type speed change mechanism, generally speaking, a shift drum has its outer circumference formed with a plurality of lead grooves, with which the gear changing shifters of a speed change gear mechanism are made to engage. The shift drum is intermittently turned through predetermined angles by the step-up or step-down action of a speed change pedal so that a plurality of shifters may be selectively moved in accordance with those turning movements to change the meshing engagements of the shift gears, thereby to sequentially effect the speeds at the respective steps. In the shift drum type speed change mechanism thus constructed, as the number of the steps becomes larger (e.g., six speeds), the strokes of the aforementioned lead grooves per each speed naturally become shorter, because the length of the outer circumference of the shift drum is constant. As a result, the angle of inclination of the inclined portions of the lead grooves for moving the shifters becomes so steep as to impart a high resistance to the speed changing operations. Moreover, the length of the straight portions of the lead grooves in which the shifters rest after the shifting actions are also shortened. This produces a disadvantage in that the so-called "change feeling" is worse than that for a speed change mechanism having fewer speed change steps (e.g., five speeds).

The present invention has been conceived in view of the background thus far described, and has as a major object to provide a shift drum type speed change mechanism for a motorcycle, which has a simple construction but can ensure the same "change feeling", even if it has more speed change steps (e.g., six speeds), than that for a speed change mechanism having fewer speed change steps (e.g., five speeds).

Another object of the present invention is to provide a shift drum type speed change mechanism for a motorcycle in which the shift drum can be positively retained in each selected position, and in which the shift from one gear to another can be effected lightly and smoothly.

Other objects and advantages will appear hereinafter.

In the drawings:

FIG. 5 shows the top speed position, FIG. 6 the fifth speed, FIG. 7 the fourth speed, FIG. 8 the third speed, FIG. 9 the second speed, FIG. 10 the low speed, and FIG. 11 neutral.

The present invention will be described in connection with one embodiment thereof with reference to the accompanying drawings, and in case the invention is practised in a speed change gear mechanism having six speeds. In the transmission case M of an internal combustion engine which is mounted on a motorcycle, there is rotatably borne the shift drum 1 of a drum type speed change mechanism. A shifter guide shaft 2 is supported on the transmission case M adjacent to the shift drum 1. The shift drum 1 has its outer circumference formed with a plurality of lead grooves $3_1$, $3_2$ and $3_3$ which are spaced in the longitudinal direction thereof, whereas the shifter guide shaft 2 slidably supports such shifters $4_1$, $4_2$ and $4_3$ thereon as are the same in number as that of the lead grooves $3_1$, $3_2$ and $3_3$. Guide pins $5_1$, $5_2$ and $5_3$ are anchored in those shifters $4_1$, $4_2$ and $4_3$, respectively, and are so arranged to engage with the lead grooves $3_1$, $3_2$ and $3_3$ as to move relative to the latter. The shifters $4_1$, $4_2$ and $4_3$ engage with the shift gears $6_1$, $6_2$ and $6_3$ of a speed change gear mechanism G which is mounted in the transmission case M. When the shift drum 1 is intermittently turned through each speed change angle, as will be described in more detail hereinafter, the shifters $4_1$, $4_2$ and $4_3$ are selectively controlled by the lead grooves $3_1$, $3_2$ and $3_3$ to slide along the guide shaft 2, thereby to shift the speed change gear mechanism G in a plurality of steps. The speed changing operations of the speed change gear mechanism G by the shifters $4_1$, $4_2$ and $4_3$ are well known in the art, and their detailed description is omitted here.

Figure 3:
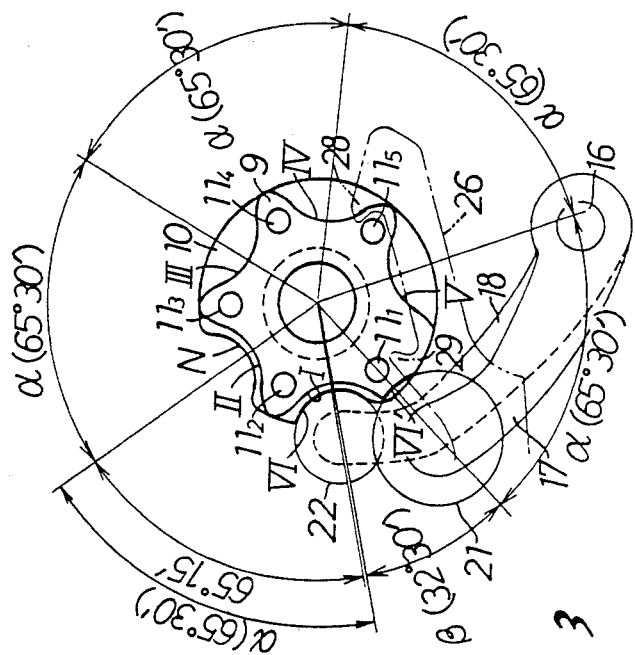
FIG. 3 is an end elevation of a portion of the apparatus.

The shift drum 1 is constructed to provide the six speeds. A speed change cam member 7 is secured to one end of the shift drum. This speed change cam member 7 is integrally formed with a first cam plate 9 outside of an annular groove 8 and a second cam plate 10 inside of the same. The speed change cam member 7 has its whole circumference set, as shown in FIG. 3, with respective speed change angles $\alpha$ of 65°30′, which are calculated for first to sixth speeds by dividing 360° by 5.5, and a remaining angle $\beta$ which is left unused, for the speed changing operation and which is calculated between the sixth speed and the first speed to 32°30′ (360° − 65°30′ × 5). The first cam plate 9 is formed into such a star shape as to have its outer circumference formed clockwise, as viewed in FIG. 3, with both first to fifth speed arcuate stopper groove I, II, III, IV and V, which are spaced at the aforementioned speed change angles $\alpha$ (65°30′) from one another, and a sixth speed arcuate but smaller auxiliary stopper groove VI', which is angularly spaced at the aforementioned remaining angle $\beta$ (32°30′) from the first speed stopper groove I.

The speed change cam member 7 is radially equipped with first to fifth drum pins $11_1$, $11_2$, $11_3$, $11_4$ and $11_5$ which extend through the first and second cam plates 9 and 10. These first to fifth drum pins $11_1$ to $11_5$ are all located at the apexes of the star-shaped first cam plate 9 such that the first drum pin $11_1$ is positioned in the vicinity of the aforementioned auxiliary stopper groove 38. The second to fifth drum pins $11_2$, $11_3$, $11_4$ and $11_5$ are positioned between the stopper grooves I and II, II and III, III and IV and V respectively, such that the angular spacing between any adjacent two pins from the first drum pin $11_1$ to the fifth drum pin $11_5$ is the aforementioned speed change angle $\alpha$ (65°30′), and such that the fifth and first drum pins $11_5$ and $11_1$ are angularly spaced at a larger angle than the sum of the speed change angle $\alpha$ (65°30′) and the remaining angle $\beta$ (32°30′).

Figure 4:
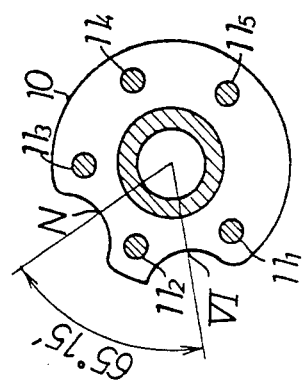
FIG. 4 is a detail showing a portion of FIG. 3, certain parts being removed.

The second cam plate 10 is arranged, as shown in FIG. 4, with the first to fifth drum pins $11_1$ to $11_5$ such that its outer circumference between the first and second drum pins $11_1$ and $11_2$ is formed with the sixth speed stopper groove VI whereas its outer circumference between the second and third drum pins $11_2$ and $11_3$ is formed with a neutral stopper groove N.

In the vicinity of the shift drum 1, there are turnably supported on the transmission case M by means of a support pin 16 a first stopper 17 and a second stopper 18. The stopper 17 is biased to rock toward the first cam plate 9 by the action of a first stopper spring 19, and the stopper 18 is biased to rock toward the second cam plate 10 by the action of a second stopper spring 20. On the leading ends of the first and second stoppers 17 and 18 there are rotatably mounted first and second stopper rollers 21 and 22. The stopper roller 21 is adapted to sequentially engage with the first to fifth speed stopper grooves I to V and the sixth speed auxiliary stopper groove VI', all formed in the first cam plate 9. The stopper roller 22 is adapted to engage with the sixth speed and neutral stopper grooves VI and N both formed in the second cam plate 10.

Figure 1:
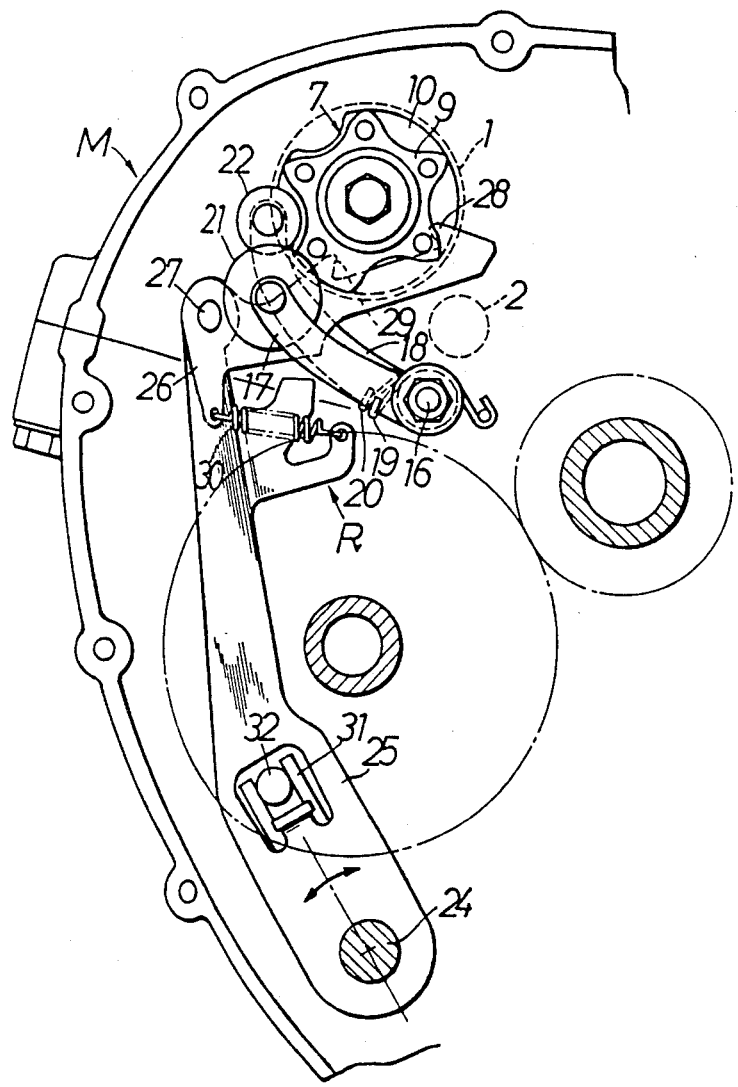
FIG. 1 is an end elevation partly broken away, showing a preferred embodiment of this invention.
Figure 2:
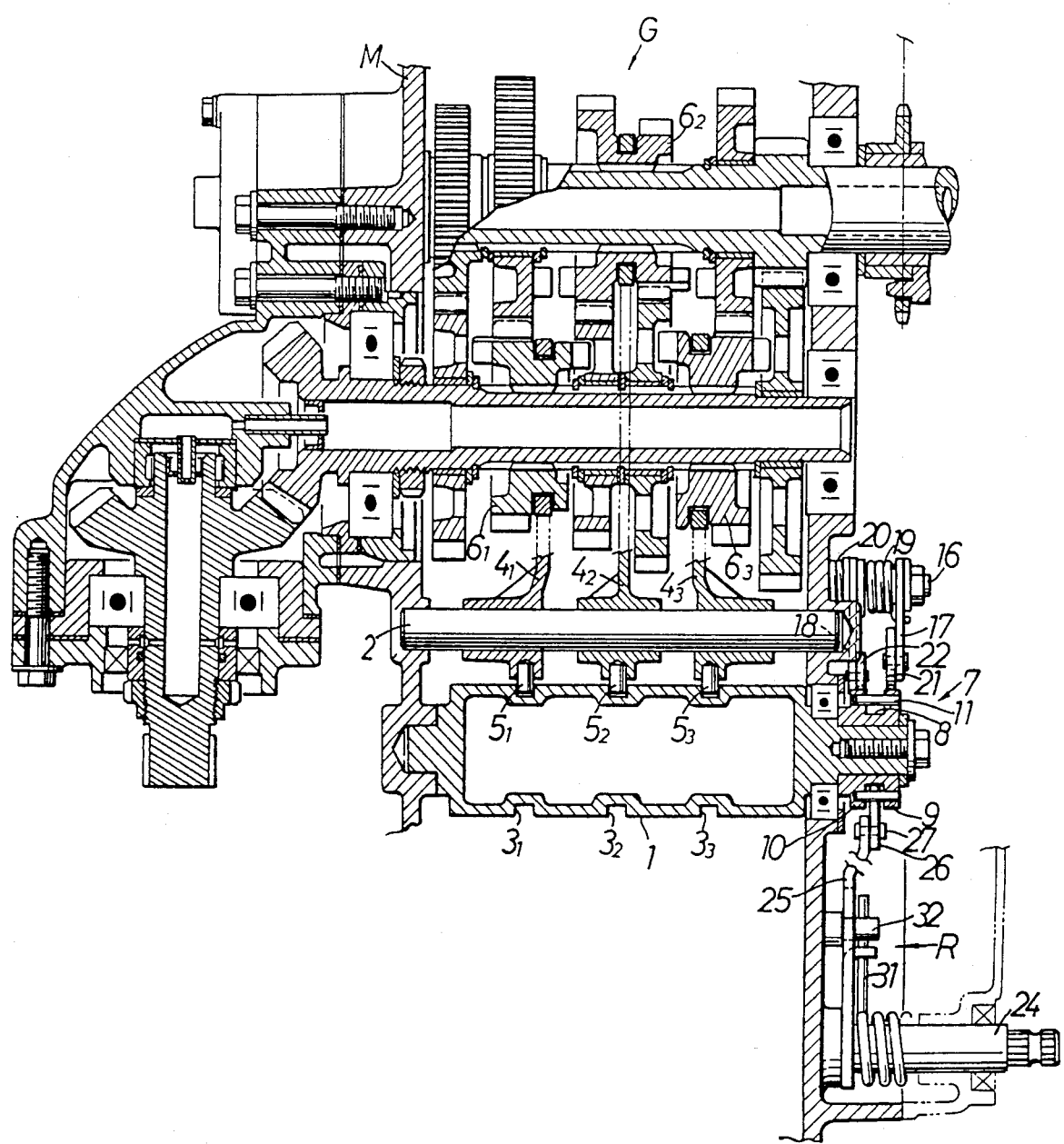
FIG. 2 is a sectional plan view.

Below the shift drum 1, as shown in FIG. 1, there is disposed a shift drum rotating mechanism R which is well known in the art. In the transmission case M, specifically, there is turnably mounted a change spindle 24 which is equipped with a change pedal, not shown, and to which a change arm 25 is integrally fixed. On the leading end of this change arm 25 there is pivotably mounted by means of a support pin 27 a drum rotating arm 26 from which a pair of pawls 28 and 29 protrude, facing each other. A spring 30 is mounted under tension between the change arm 25 and the drum rotating arm 26 and operates to effect engagement between the pawls 28 and 29 of the drum rotating arm 26 and the aforementioned first to fifth drum pins $11_1$ to $11_5$. On the change arm 25, as is well known in the art, there are mounted a return spring 31 and a stopper pin 32, which coact to hold the change arm 25 at its inoperative position, as shown in FIG. 1, when no operating force is exerted upon the change spindle 24.

Figure 6:
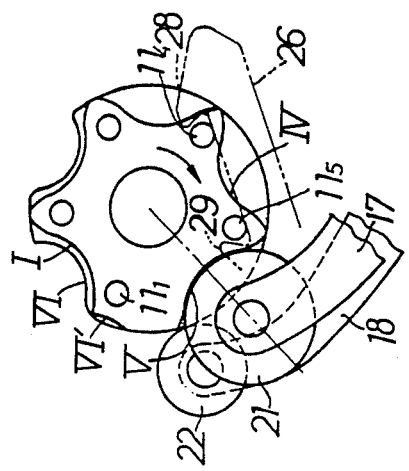

The operation of this embodiment of the invention is described as follows: FIG. 3 shows the position of the parts when the shift drum 1 is at the sixth speed position (i.e., the top speed). The stopper roller 21 of the first stopper 17 engages with the sixth speed auxiliary stopper groove VI' of the first cam plate 9, whereas the second stopper 18 engages with the sixth speed stopper groove VI of the second cam plate 10, thereby to hold the shift drum 1 at the sixth speed position. By the actions of the lead grooves $3_1$, $3_2$ and $3_3$ formed in the shift drum 1, the shift drum 1 cannot be turned, as customary, to the first speed position (i.e., the low speed), namely, counterclockwise as shown in FIG. 3. Now, if the drum rotating arm 26 is shifted one stroke to the left in FIGS. 3 and 5 by turning of the change spindle 24 resulting from the operations of the speed change pedal, the shift drum 1 is turned through the unit speed change angle $\alpha$, i.e., 65°30'. This occurs by engagement between the fifth drum pin $11_5$ and the pawl 28 so that the first stopper roller 21 of the first stopper 17 is disengaged from the auxiliary stopper groove VI' to engage with the fifth speed stopper groove V. The second stopper roller 22 of the second stopper 18 is disengaged from the sixth speed stopper groove VI of the second cam plate 10 to abut against the outer circumference of the same thereby to establish the position of the parts in the fifth speed position shown in FIG. 6. By the turns of the shift drum 1, the shifters $4_1$, $4_2$ and $4_3$ engaging with the lead grooves $3_1$, $3_2$ and $3_3$ thereof move along the shifter guide shaft 2 to bring the speed change gear mechanism G into the state of the fifth speed.

If the drum turning arm 26 is subsequently likewise moved stroke by stroke to the left by the operation of the speed change pedal, the pawl 28 is brought into sequential engagement with the fifth, fourth, third, second and first drum pins $11_5$, $11_4$, $11_3$, $11_2$ and $11_1$ to intermittently turn the shift drum 1 through the unit speed change angle $\alpha$, i.e., 65°30'', in the counterclockwise direction, thereby to effect the shifts to the fifth, fourth, third, second and first speeds, as shown in FIGS. 5 to 10.

Figure 11:
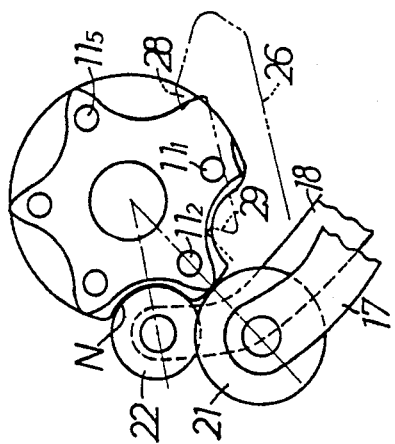
Figure 10:
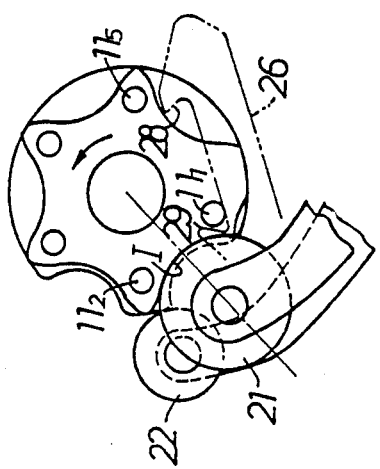
Figure 9:
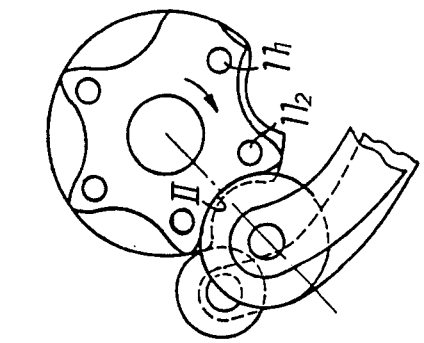

At the step of a half stroke, in which the shift drum 1 is in its course from the second speed to the first speed (i.e., the low speed), as shown in FIGS. 9 and 10, the second stopper roller 22 of the second stopper 18 engages with the neutral stopper groove N, as shown in FIG. 11, to stop the shift drum at the neutral position, thereby to hold the speed change gear mechanism G at the neutral position through the shifters $4_1$, $4_2$ and $4_3$.

Figure 5:
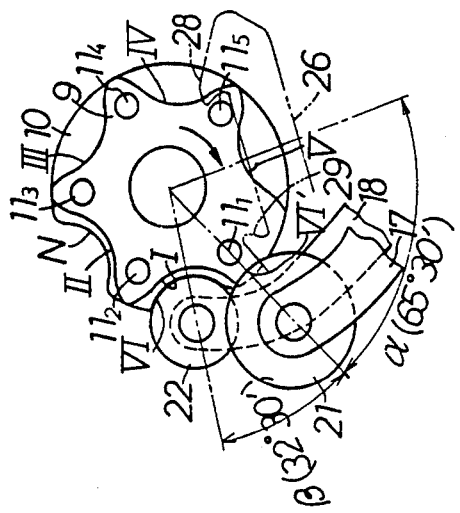
Figure 8:
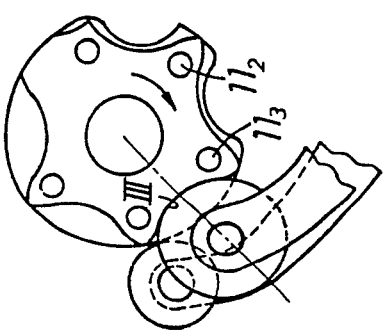

In case the shift drum 1 is turned stroke by stroke, i.e., the angle of 65°30' in the clockwise direction of FIG. 3, as has been described hereinbefore, the speed changing operations of six steps can be accomplished to the sixth (i.e., the top speed), the fifth speed, the fourth speed, the third speed, the second speed and the first speed (i.e., the low speed), as shown in FIGS. 5 to 10. At the half stroke between the second speed and the first speed, moreover, the shift drum 1 is retained at the neutral position, as shown in FIG. 5. If, moreover, the shift drum 1 is rotated to the position of the first speed (i.e., the low speed), the shifters $4_1$, $4_2$ and $4_3$ reach the respective one-side ends of the lead grooves $3_1$, $3_2$ and $3_3$ formed in the outer circumference thereof so that it is not rotated any more in the clockwise direction of FIG. 3, i.e., from the first speed to the sixth speed. On the other hand, the remaining angle $\beta$ from the first speed to the sixth speed, at which the shift drum is held from turning, is 32°30'.

If the change spindle 24 is rocked in the opposite direction from the state of the first speed (i.e., the low speed) shown in FIG. 5 by the opposite operation of the speed change pedal, the drum rotating arm 26 is in turn moved rightward in FIG. 3 so that the other pawl 29 sequentially engages with the drum pins $11_1$, $11_2$ and so on to rotate the shift drum 1 stroke by stroke in the counterclockwise direction, thereby to effect the speed changing operations from the first speed to the sixth speed in the order of FIGS. 10 to 5, which is opposite to the aforementioned one. In this case, too, the neutral position shown in FIG. 11 can be held at the half stroke from the first speed to the second speed, and turning of the remaining angle $\beta$ (i.e., 32°30') from the sixth speed to the first speed cannot be effected.

Figure 12:
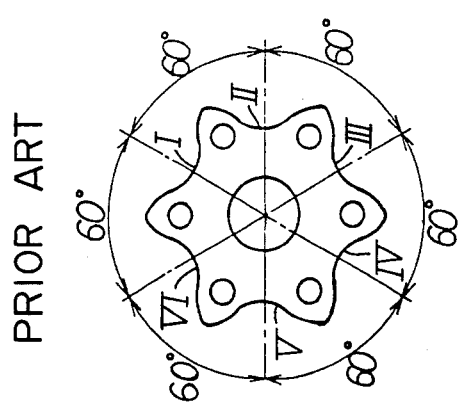
FIG. 12 is an end view of a prior art shift drum speed change mechanism.
Figure 7:
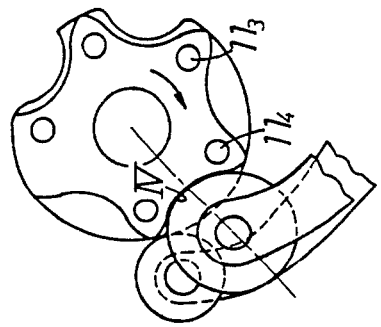
FIGS. 5, 6, 7, 8, 9, 10 and 11 are end views showing the changes in position of the shift drum control mechanism for six different speeds and neutral.

Now, the shift drum 1 of the drum type speed change mechanism of this kind according to the prior art is formed with equi-angularly spaced stopper grooves for the six speeds. For example, the first to sixth speed stopper grooves are spaced at the same unit angle of 60°, as shown in FIG. 12. The drum is prevented from turning between the first speed position and the sixth speed position, in the prior art device. In the case of the speed change of the six steps of the foregoing embodiment of this invention, the shift drum 1 is turned at the unit speed change angle of 65°30' from the first speed to the sixth speed, as has been described hereinbefore, so that the strokes of the unit speed change angle $\alpha$ of the lead grooves $3_1$, $3_2$ and $3_3$ formed in the outer circumference of the shift drum 1 can be elongated to make the angle of inclination of the inclined portions of those lead grooves $3_1$, $3_2$ and $3_3$ for shifting the shifters $4_1$, $4_2$ and $4_3$ more gently than that of the prior art, thereby to lighten and smooth the speed changing operations and to elongate the straight portions of the aforementioned lead grooves $3_1$, $3_2$ and $3_3$ for holding the shifters $4_1$, $4_2$ and $4_3$ in position after they have been shifted, thus stabilizing the speed change positions of the shifters $4_1$, $4_2$ and $4_3$.

As described above, according to the present invention, the unit speed change angle of all the speeds of the shift drum is set to be larger than the angular value which is calculated by dividing the angle 360° by the total number of speeds. Therefore, the strokes per unit speed change angle of the lead grooves are such that the angle of inclination of the inclined portions of the lead grooves can be made gentle, and the straight portion of those lead grooves can be alongated to smooth and lighten the speed changing operations of the speed change pedal. Also, this stabilizes the stationary positions of the respective shifters, whereby the "change feeling" can be remarkably improved as a whole.

According to the second feature of the present invention, moreover, since, in addition to the feature of the remarkably improved "change feeling", the stopper for retaining the shift drum at the respective speed steps is composed of the first stopper for regulating a portion of the number of all the speeds of the shift drum and a second stopper for regulating the remaining speed or speeds, the interruption of the turning movements of the shift drum can be accomplished reliably and accurately by the actions of the first and second stoppers even if the angle at which the shift drum is held from turning, is small, i.e., the angle between the lowest speed and the highest speed.

If, moreover, the first stopper is made also to regulate that speed step of the shift drum, which is regulated by the second stopper, the change feeling obtainable from the first stopper can be imparted to the speed step by the second stopper, and there can exist no difference in the change feeling accompanying the shift from the speed step by the first stopper to the speed step by the second stopper.

Having fully described my invention, it is to be understood that I am not to be limited to the details herein set forth but that my invention is of the full scope of the appended claims.

I claim:
1. A speed change mechanism for a transmission of a motorcycle, comprising
   a shift drum;
   a first cam plate fixed to said drum and having a first cam surface having a series of stopper grooves in said first cam surface with each succeeding groove in said series being spaced equiangularly from the proceding groove in said series;
   a first stopper engaging said first cam surface;
   a second cam plate fixed to said drum and having a second cam surface with at least one stopper groove in said second cam surface;
   a second stopper engaging said second cam surface, said second stopper engaging said stopper groove in said second cam surface with said first stopper being spaced from the last stopper groove in said series by an amount equal to the equiangular spacing between stopper grooves.

2. The speed change mechanism of claim 1 wherein said first stopper is spaced from the first stopper groove in said series on said first cam surface by less than said equiangular spacing between succeeding grooves in said series when said second stopper engages said stopper groove on said second cam surface.

3. The speed change mechanism of claim 1 wherein said first cam surface further has a partial stopper groove in which said first stopper is positioned when said second stopper is positioned in said stopper groove of said second cam surface.

4. The speed change mechanism of claim 3 wherein there are five stopper grooves in said series and said one partial stopper groove in said first cam surface.

5. The speed change mechanism of claim 1 wherein said second cam surface includes a neutral stopper groove, said first stopper being positioned between succeeding stopper grooves in said series when said second stopper engages said neutral stopper groove in said second cam surface.

6. The speed change mechanism of claim 1 wherein there are five stopper grooves in said series spaced by in excess of 60°, said stopper groove in said second cam surface being positioned such that said first stopper is positioned in excess of 60° past the last of said stopper grooves of said series when said second stopper engages said stopper groove of said second cam surface.

* * * * *

UNITED STATES PATENT AND TRADEMARK OFFICE
CERTIFICATE OF CORRECTION

PATENT NO.   : 4,491,031
DATED        : January 1, 1985
INVENTOR(S)  : YUZO OOKA It is certified that error appears in the above—identified patent and that said Letters Patent is hereby corrected as shown below:

In claim 1, line 8, delete "proceding" and insert therefor -- preceding --.

Signed and Sealed this

Fourteenth Day of May 1985

[SEAL]

Attest:

DONALD J. QUIGG

*Attesting Officer*   *Acting Commissioner of Patents and Trademarks*